(12) United States Patent
Shin et al.

(10) Patent No.: US 8,774,996 B2
(45) Date of Patent: Jul. 8, 2014

(54) COOLING SYSTEM FOR COOLING DRIVING MOTOR OF HYBRID VEHICLE AND METHOD FOR CONTROLLING THE SAME

(75) Inventors: Gwang Seob Shin, Gyeonggi-do (KR); Jong Hyun Kim, Gyeonggi-do (KR); Youngchul Kim, Gyeonggi-do (KR); Jang Mi Lee, Gyeongsangnam-do (KR); Jaeshin Yi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 206 days.

(21) Appl. No.: 13/170,500

(22) Filed: Jun. 28, 2011

(65) Prior Publication Data

US 2012/0143414 A1  Jun. 7, 2012

(30) Foreign Application Priority Data

Dec. 2, 2010  (KR) .................. 10-2010-0122244

(51) Int. Cl.
  *F25D 23/12* (2006.01)
  *H02K 9/00* (2006.01)
  *B60L 11/00* (2006.01)

(52) U.S. Cl.
  USPC ............................. 701/22; 318/139; 318/471

(58) Field of Classification Search
  USPC ........ 180/65.21; 318/471, 472, 139; 361/699; 701/22
  See application file for complete search history.

(56) References Cited

U.S. PATENT DOCUMENTS

| 5,217,085 | A | * | 6/1993 | Barrie et al. | ............... | 184/104.1 |
| 5,661,384 | A | * | 8/1997 | Glibbery | ...................... | 318/471 |
| 6,323,613 | B1 | * | 11/2001 | Hara et al. | ..................... | 318/471 |
| 6,467,286 | B2 | * | 10/2002 | Hasebe et al. | .................. | 62/185 |
| 6,897,782 | B2 | * | 5/2005 | Heinrich et al. | ............... | 340/588 |
| 6,941,245 | B2 | * | 9/2005 | Longnecker et al. | ......... | 702/184 |
| 7,616,443 | B2 | * | 11/2009 | Walter | .......................... | 361/699 |
| 8,080,909 | B2 | * | 12/2011 | Perkins | ........................... | 310/64 |
| 2004/0045749 | A1 | * | 3/2004 | Jaura et al. | ................... | 180/65.2 |
| 2011/0272118 | A1 | * | 11/2011 | Lundberg et al. | .............. | 165/51 |
| 2011/0279074 | A1 | * | 11/2011 | Yeh et al. | ...................... | 318/432 |

FOREIGN PATENT DOCUMENTS

| JP | 2002-135907 A | 5/2002 |
| JP | 2006081240 A | 3/2006 |
| JP | 2008271712 A | 11/2008 |
| JP | 2010-213461 A | 9/2010 |
| JP | 2010195313 A | 9/2010 |

\* cited by examiner

*Primary Examiner* — Fadey Jabr
*Assistant Examiner* — Martin Weeks
(74) *Attorney, Agent, or Firm* — Edwards Wildman Palmer LLP; Peter F. Corless (57) ABSTRACT

The present invention relates to a cooling system for cooling a driving motor of a hybrid vehicle and a method for controlling the same which supplies suitable cooling flow according to temperature and temperature change rate of the driving motor. An exemplary embodiment may include: an electric oil pump to generate hydraulic pressure for cooling the driving motor; a switching valve to selectively transmit the hydraulic pressure to the driving motor; a solenoid valve to selectively supply control pressure to the switching valve so as to switch hydraulic lines in the switching valve; and a control portion controlling operations of the electric oil pump and the switching valve, wherein the control portion operates the electric oil pump by various operation amounts or stops the electric oil pump according to temperature of the driving motor and temperature change rate of the driving motor, and turns on or off the solenoid valve.

4 Claims, 6 Drawing Sheets

COOLING SYSTEM FOR COOLING DRIVING MOTOR OF HYBRID VEHICLE AND METHOD FOR CONTROLLING THE SAME

CROSS-REFERENCE TO RELATED APPLICATION

This application claims priority to and the benefit of Korean Patent Application No. 10-2010-0122244 filed in the Korean Intellectual Property Office on Dec. 2, 2010, the entire contents of which are incorporated herein by reference.

BACKGROUND OF THE INVENTION (a) Field of the Invention

The present invention relates to a cooling system for cooling a driving motor of a hybrid vehicle and a method for controlling the same. More particularly, the present invention relates to a cooling system for cooling a driving motor of a hybrid vehicle and a method for controlling the same which supplies suitable cooling flow according to temperature and temperature change rate of the driving motor.

(b) Description of the Related Art

Generally, a hybrid vehicle is a vehicle which uses an engine and a driving motor as power sources. If the driving motor used in the hybrid vehicle is operated, a lot of heat may be generated. The heat generated by the driving motor damages electronic devices sensitive to temperature in the vehicle and deteriorates efficiency of the driving motor. Therefore, suitable cooling flow should be supplied according to temperature change of the driving motor.

Since hydraulic lines for supplying oil to the driving motor are located downstream of a regulating valve according to a cooling system of a conventional hybrid vehicle, the regulating valve controls oil amount so as to maintain line pressure even if engine speed and oil amount discharged from a hydraulic pump increase. Therefore, flow of oil supplied to the hydraulic lines for supplying the oil to the driving motor is generally constant.

In addition, an additional electric oil pump for increasing the oil amount supplied to the driving motor is provided in a cooling system of a conventional hybrid vehicle, but the operational region of the electric oil pump is restricted. That is, the electric oil pump is operated only in a state of initial starting of the vehicle or electric vehicle mode (i.e., a mode at which only the motor is operated). Therefore, the electric oil pump is operated regardless of temperature of the driving motor.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a cooling system for cooling a driving motor of a hybrid vehicle and a method for controlling the same having advantages of supplying suitable cooling flow to a driving motor according to temperature and temperature change rate of the driving motor.

A cooling system for cooling a driving motor of a hybrid vehicle according to an exemplary embodiment of the present invention may include: an electric oil pump adapted to generate hydraulic pressure for cooling the driving motor of the hybrid vehicle; a switching valve adapted to selectively transmit the hydraulic pressure generated by the electric oil pump to the driving motor; a solenoid valve adapted to selectively supply control pressure to the switching valve so as to switch hydraulic lines in the switching valve; and a control portion controlling operations of the electric oil pump and the switching valve, wherein the control portion operates the electric oil pump by select (e.g., first, second, and third) operation amounts or stops the electric oil pump according to temperature of the driving motor and temperature change rate of the driving motor, and turns on or off the solenoid valve.

As an example, the control portion may operate the electric oil pump by the first operation amount and may turn on the solenoid valve in a case that the temperature change rate of the driving motor is larger than or equal to the first predetermined value.

The control portion may operate the electric oil pump by the second operation amount and may turn on the solenoid valve in a case that the temperature change rate of the driving motor is larger than or equal to the second predetermined value and is smaller than the first predetermined value and the temperature of the driving motor is higher than or equal to reference temperature.

The control portion may operate the electric oil pump by the third operation amount and may turn on the solenoid valve in a case that the temperature change rate of the driving motor is larger than or equal to the third predetermined value and is smaller than the second predetermined value and the temperature of the driving motor is larger than or equal to the reference temperature.

The control portion may turn off the electric oil pump and the solenoid valve in a case that the temperature change rate of the driving motor is smaller than the third predetermined value, or the temperature change rate of the driving motor is larger than or equal to the third predetermined value and is smaller than the first predetermined value and the temperature of the driving motor is lower than the reference temperature.

A method for controlling a cooling system according to another exemplary embodiment of the present invention may include: determining whether the driving motor operates; detecting temperature of the driving motor in a case that the driving motor operates; calculating temperature change rate of the driving motor based on the temperature of the driving motor; determining whether the temperature change rate of the driving motor is larger than or equal to a first predetermined value; and operating the electric oil pump by the first operation amount and turning the solenoid valve in a case that the temperature change rate of the driving motor is larger than or equal to the first predetermined value.

The method, in a case that the temperature change rate of the driving motor is smaller than the first predetermined value, may further include: determining whether the temperature of the driving motor is higher than or equal to reference temperature; determining whether the temperature change rate of the driving motor is larger than or equal to a second predetermined value in a case that the temperature of the driving motor is higher than or equal to the reference temperature; and operating the electric oil pump by the second operation amount and turning on the solenoid valve in a case that the temperature change rate of the driving motor is larger than or equal to the second predetermined value.

The electric oil pump and the solenoid valve may be turned off in a case that the temperature of the driving motor is lower than the reference temperature.

The method, in a case that the temperature change rate of the driving motor is smaller than the second predetermined value, may further include: determining whether the temperature change rate of the driving motor is larger than or equal to the third predetermined value; and operating the electric oil pump by the third operation amount and turning on the solenoid valve in a case that the temperature change rate of the driving motor is larger than or equal to the third predetermined value.

The electric oil pump and the solenoid valve may be turned off in a case that the temperature change rate of the driving motor is smaller than the third predetermined value.

DETAILED DESCRIPTION OF THE EMBODIMENTS

An exemplary embodiment of the present invention will hereinafter be described in detail with reference to the accompanying drawings.

Also, it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
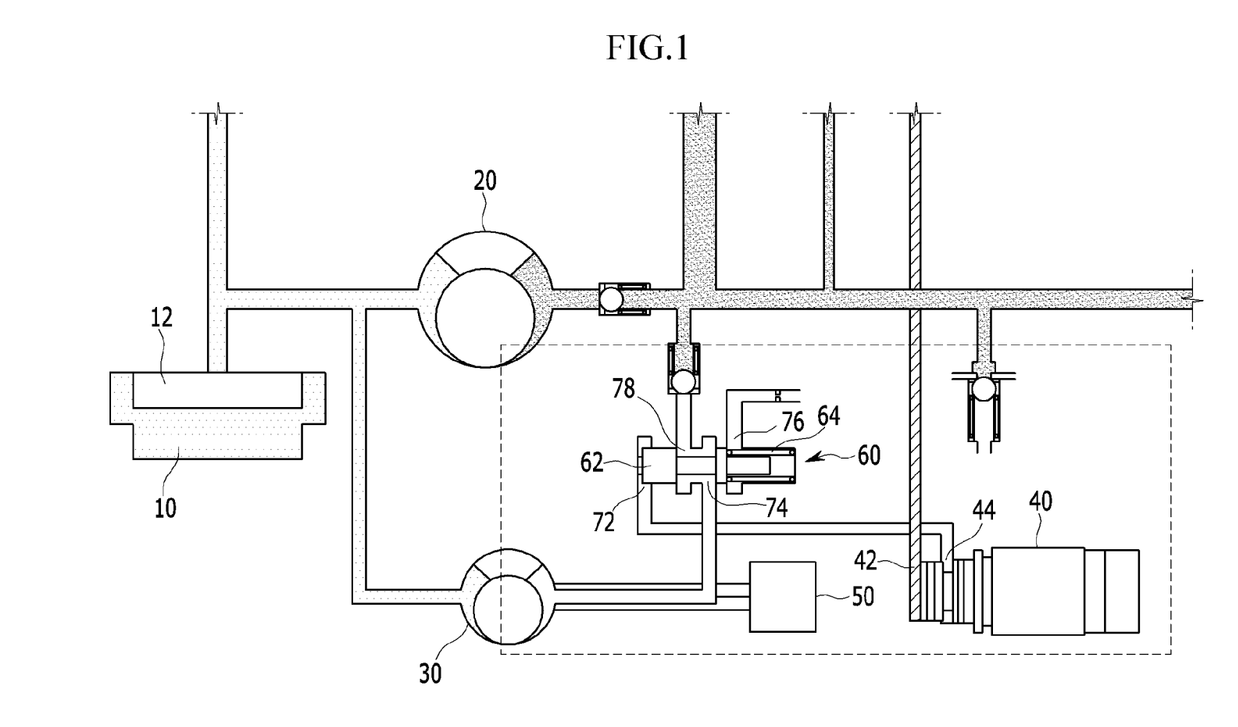
FIG. 1 and FIG. 2 are circuit diagrams of a cooling system for cooling a driving motor of a hybrid vehicle according to an exemplary embodiment of the present invention.
Figure 2:
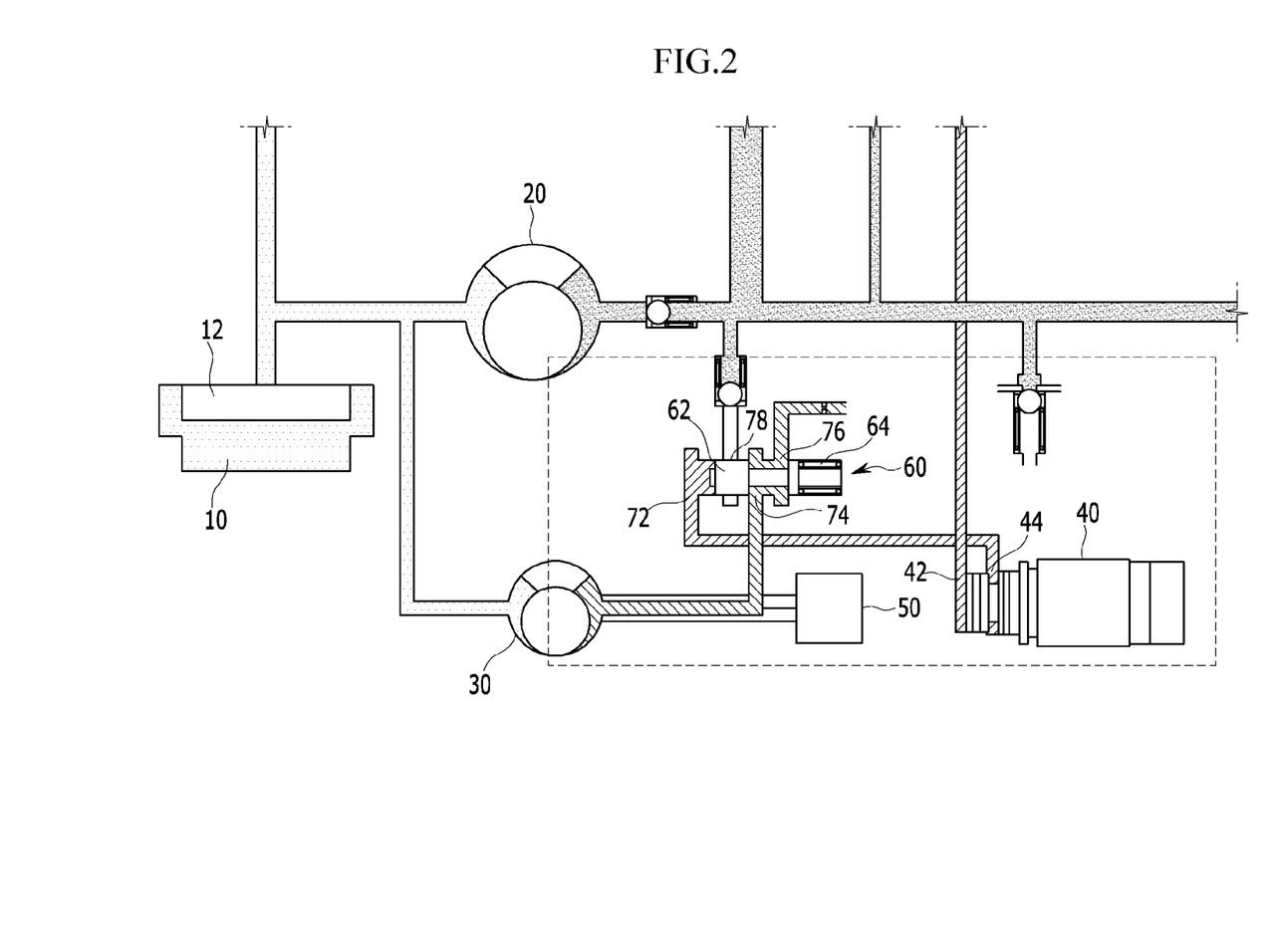

FIG. 1 and FIG. 2 are circuit diagrams of a cooling system for cooling a driving motor of a hybrid vehicle according to an exemplary embodiment of the present invention. Especially, FIG. 1 is a circuit diagram when the cooling system does not operate, and FIG. 2 is a circuit diagram when the cooling system operates.

As shown in FIG. 1 and FIG. 2, a cooling system for cooling a driving motor of a hybrid vehicle according to an exemplary embodiment of the present invention includes an oil pan 10, a hydraulic pump 20, an electric oil pump 30, a solenoid valve 40, a motor 50, and a switching valve 60.

Cooling oil is stored in the oil pan 10 and the oil pan 10 supplies the oil to the cooling system. An oil filter 12 is mounted at an outlet of the oil pan 10 so as to filter moisture and foreign materials in the oil.

The hydraulic pump 20 pressurizes the oil received from the oil pan 10 and supplies it to a transmission or an engine. A regulating valve is mounted at a hydraulic line downstream of the hydraulic pump 20 so as to regulate hydraulic pressure generated by the hydraulic pump 20 to line pressure.

The electric oil pump 30 is disposed in parallel with the hydraulic pump 20. That is, the electric oil pump 30 is not directly affected by operation of the hydraulic pump 20. The electric oil pump 30 pressurizes the oil supplied from the oil pan 10 and supplies it to the switching valve 60.

The solenoid valve 40 is operated by electricity and controls the switching valve 60. The solenoid valve 40 is provided with an inlet port 42 for receiving hydraulic pressure from means for generating hydraulic pressure (not shown) and an outlet port 44 for selectively supplying the oil supplied to the inlet port 42 to the switching valve 60 as control pressure thereof. Therefore, the hydraulic pressure received through the inlet port 42 is supplied to the switching valve 60 through the outlet port 44 in a case that the solenoid valve 40 operates.

The motor 50 operates the electric oil pump 30. That is, the motor 50 is operated in a case that current is applied to the motor 50, and the motor 50 operates the electric pump 30.

The switching valve 60 selectively supplies the hydraulic pressure generated by the electric oil pump 30 to a driving motor. For this purpose, the switching valve 60 includes a valve body and a valve spool 62 reciprocally moving in the valve body so as to switch hydraulic lines. In addition, an elastic member 64 is interposed between the valve spool 62 and the valve body so as to apply restoring force to the valve spool 62.

The valve body includes a first port 72 receiving the control pressure from the solenoid valve 40, a second port 74 receiving the hydraulic pressure from the electric oil pump 30, a third port 76 selectively connected to the second port 74 and selectively supplying the hydraulic pressure of the second port 74 to the driving motor, and a fourth port 78 selectively connected to the second port 74 and selectively connected to hydraulic line at a downstream of the hydraulic pump 20. A check valve is provided between the hydraulic line downstream of the hydraulic pump 20 and the fourth port 78. Therefore, the hydraulic pressure of the fourth port 78 can be supplied to the hydraulic line downstream of the hydraulic pump 20, but the hydraulic pressure of the hydraulic pump 20 cannot be supplied to the fourth port 78.

As shown in FIG. 1, if the cooling system does not operate, the electric oil pump 30 does not operate and the solenoid valve 40 is turned off. Therefore, the electric oil pump 30 does not generate the hydraulic pressure and the hydraulic pressure is not supplied to the driving motor.

As shown in FIG. 2, if the cooling system operates, the electric oil pump 30 operates and the solenoid valve 40 is turned on. Therefore, the electric oil pump 30 generates the hydraulic pressure and the generated hydraulic pressure is supplied to the second port 74 of the switching valve 60. In addition, the solenoid valve 40 supplies the control pressure to the first port 72 of the switching valve 60. In this case, the control pressure of the first port 72 overcomes elastic force of the elastic member 64 and pushes the valve spool 62 to the right in the drawing. Therefore, the second port 74 and the third port 76 are communicated with each other and the hydraulic pressure of the electric oil pump 30 is supplied to the driving motor.

Figure 3:
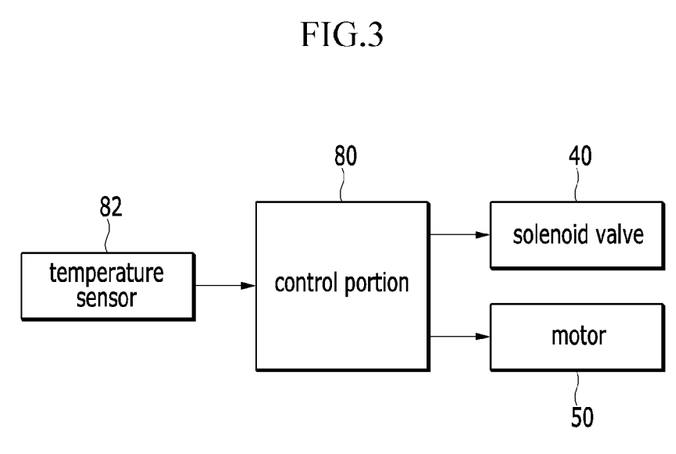
FIG. 3 is a block diagram of a cooling system for cooling a driving motor of a hybrid vehicle according to an exemplary embodiment of the present invention.

FIG. 3 is a block diagram of a cooling system for cooling a driving motor of a hybrid vehicle according to an exemplary embodiment of the present invention.

As shown in FIG. 3, the cooling system according to an exemplary embodiment of the present invention further includes a temperature sensor 82 and a control portion 80.

The temperature sensor 82 detects temperature of the driving motor and transmits a signal corresponding thereto to the control portion 80.

The control portion 80 divides temperature change of the driving motor by a time so as to calculate temperature change rate of the driving motor. In addition, the control portion 80 controls operation of the solenoid valve 40 and the motor 50

(i.e., electric oil pump 30) based on the temperature and the temperature change rate of the driving motor.

Operation of the control portion 80 will be described in further detail with reference to FIG. 4 and FIG. 5.

Figure 4:
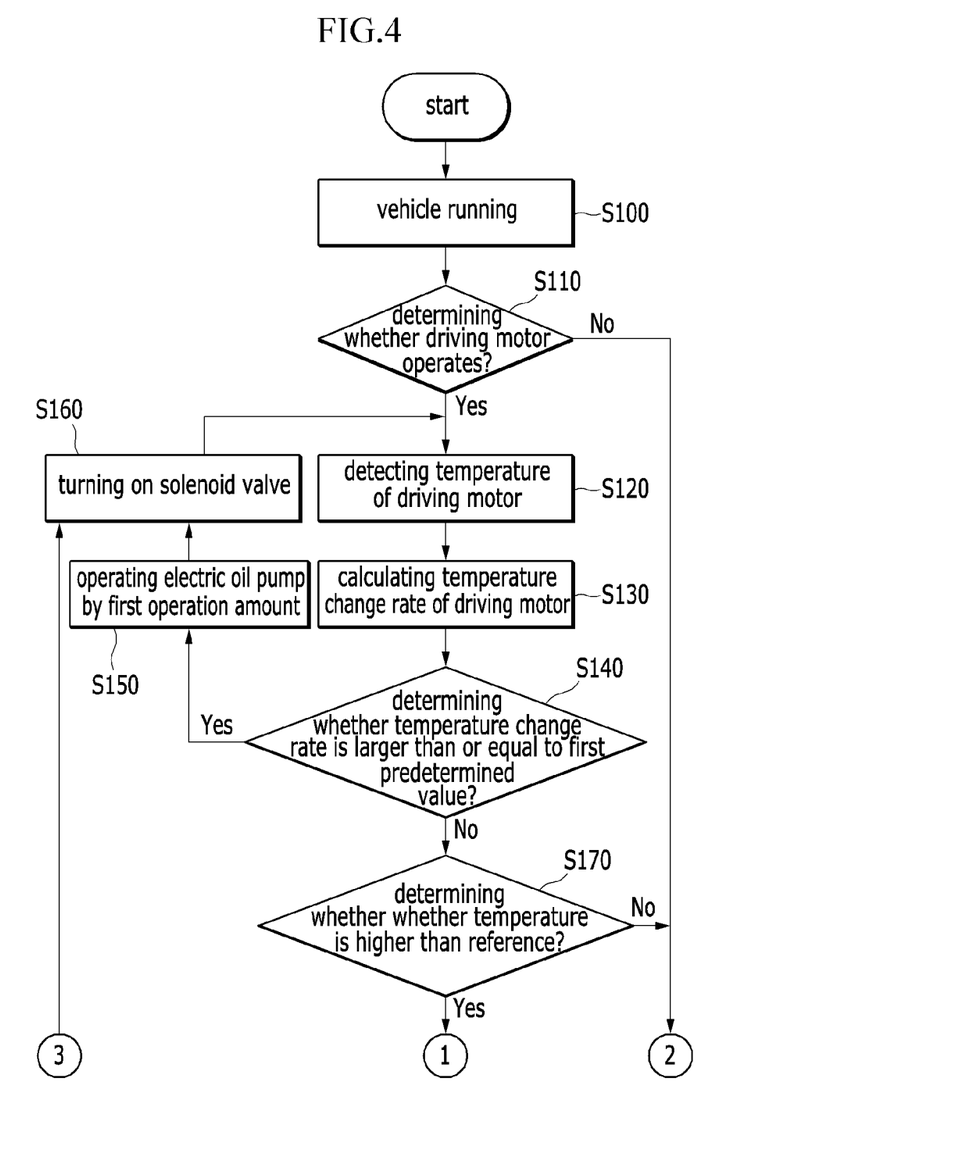
FIG. 4 and FIG. 5 are flowcharts of a method for controlling a cooling system according to an exemplary embodiment of the present invention.
Figure 5:
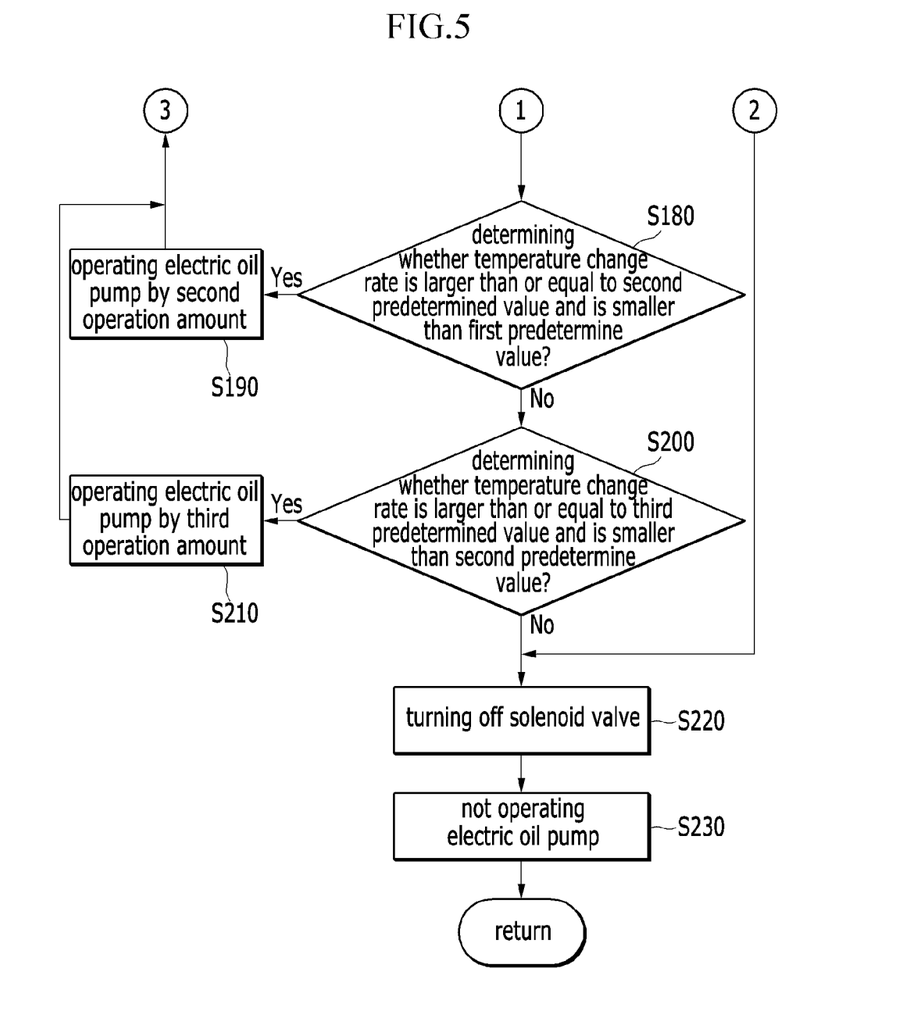

FIG. 4 and FIG. 5 are flowcharts of a method for controlling a cooling system according to an exemplary embodiment of the present invention.

As shown in FIG. 4, in a state that the vehicle runs at a step S100, the control portion 80 determines whether the driving motor operates at a step S110.

If the driving motor operates at the step S110, the control portion 80 detects the temperature of the driving motor through the temperature sensor 82 at a step S120. The temperature of the driving motor may be repeatedly detected at every predetermined period.

After that, the control portion 80 calculates the temperature change rate of the driving motor based on the repeatedly detected temperature of the driving motor at a step S130. That is, the control portion 80 divides a value obtained by subtracting a current temperature of the driving motor from a previous temperature of the driving motor by an elapsed time.

After that, the control portion 80 determines operation region at which the cooling system is currently operated, and calculates an operation amount of the electric oil pump 30 necessary for each operation region.

The operation region of the cooling system will be described in detail with reference to FIG. 6.

Figure 6:
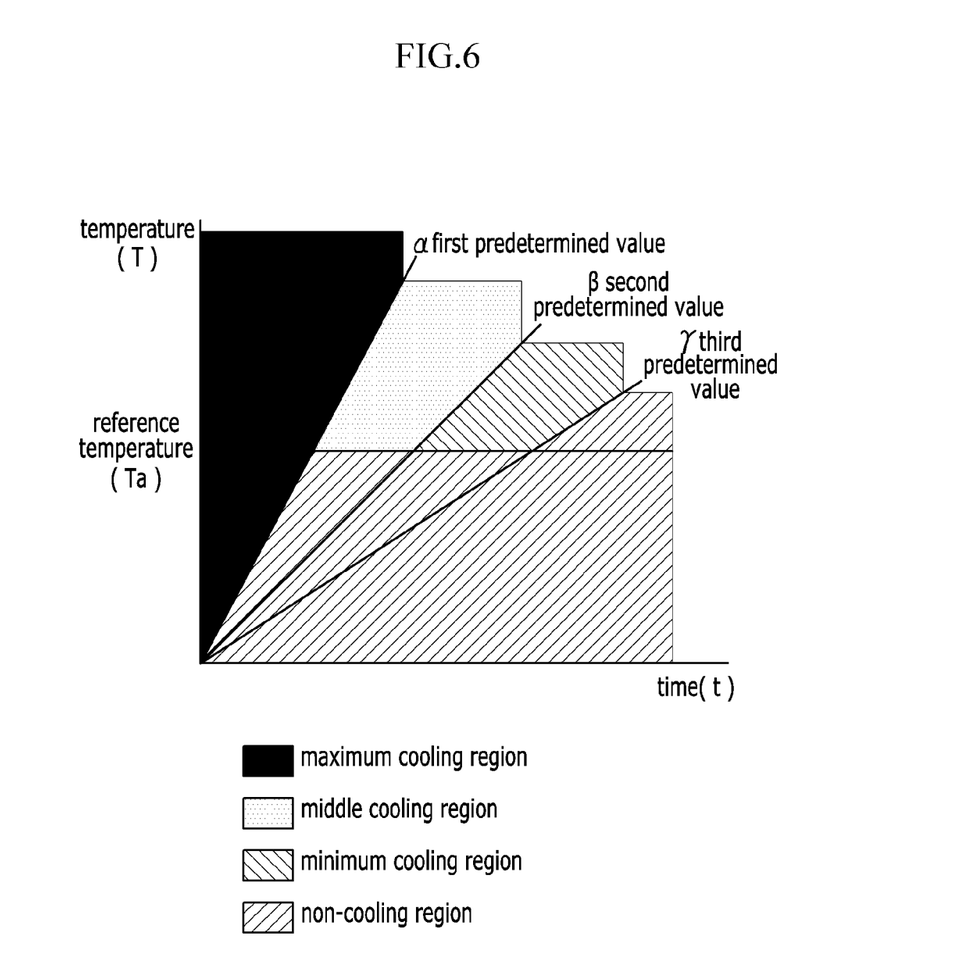
FIG. 6 is a graph illustrating the operational region of a cooling system for cooling a driving motor according to an exemplary embodiment of the present invention.

FIG. 6 is a graph illustrating an example operational region of a cooling system for cooling a driving motor according to an exemplary embodiment of the present invention. Note that the image is merely an example, and is not meant to limit the scope of the invention herein.

As shown in FIG. 6, the operation region of the cooling system is divided into four regions. The four regions are a maximum cooling region, a middle cooling region, a minimum cooling region, and a non-cooling region. The maximum cooling region is a region at which the temperature change rate of the driving motor is the largest, the middle cooling region is a region at which the temperature change rate of the driving motor is large and the temperature of the driving motor is higher than or equal to a reference temperature, and the minimum cooling region is a region at which the temperature change rate of the driving motor is small and the temperature of the driving motor is higher than or equal to the reference temperature. The non-cooling region is a region other than the maximum cooling region, the middle cooling region, and the minimum cooling region.

Referring again to FIG. 4 and FIG. 5, in order to determine the cooling region and the operation amount, the control portion 80 determines whether the temperature change rate of the driving motor is larger than or equal to a first predetermined value at a step S140.

If the temperature change rate of the driving motor is larger than or equal to the first predetermined value at the step S140, the control portion 80 operates the electric oil pump 30 by a first operation amount at a step S150 and turns on the solenoid valve 40 at a step S160. If the temperature change rate of the driving motor, however, is smaller than the first predetermined value at the step S140, the control portion 50 determines whether the temperature of the driving motor is higher than or equal to the reference temperature at a step S170.

If the temperature of the driving motor is higher than or equal to the reference temperature at the step S170, the control portion 80 determines whether the temperature change rate of the driving motor is larger than or equal to a second predetermined value and is smaller than the first predetermined value at a step S180. The second predetermined value may be smaller than the first predetermined value.

If the temperature change rate of the driving motor is larger than or equal to the second predetermined value and is smaller than the first predetermined value at the step S180, the control portion 80 operates the electric oil pump 30 by a second operation amount at a step S190 and returns to the step S160. The second operation amount is smaller than the first operation amount.

If the temperature change rate of the driving motor is smaller than the second predetermined value at the step S180, the control portion 80 determines whether the temperature change rate of the driving motor is larger than or equal to a third predetermined value and is smaller than the second predetermined value at a step S200. The third predetermined value is smaller than the second predetermined value.

If the temperature change rate of the driving motor is larger than or equal to the third predetermined value and is smaller than the second predetermined value at the step S200, the control portion 80 operates the electric oil pump 30 by a third operation amount at a step S210 and returns to the step S160. The third operation amount is smaller than the second operation amount.

If the driving motor does not operate at the step S110, the temperature of the driving motor is lower than the reference temperature at the step S170, or the temperature change rate of the driving motor is smaller than the third predetermined value at the step S200, the control portion 80 turns off the solenoid valve at a step S220 and does not operate the electric oil pump at a step S230.

Meanwhile, the first, second, and third operation amounts can be set by a designer to meet the objectives of the present invention. In addition, the first, second, and third operation amounts may be set as changing values according to the temperature of the driving motor or the temperature change rate of the driving motor.

As described above, since operating region of a driving motor is defined according to temperature and temperature change rate of the driving motor and cooling amount necessary for each operating region is supplied according to an exemplary embodiment of the present invention, the temperature of the driving motor may be prevented from rising.

In addition, efficiency and durability of the driving motor may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A cooling system for cooling a driving motor of a hybrid vehicle, comprising:
   an electric oil pump that generates hydraulic pressure for cooling the driving motor of the hybrid vehicle;

a switching valve that selectively transmits the hydraulic pressure generated by the electric oil pump to the driving motor;

a solenoid valve that selectively supplies control pressure to the switching valve so as to switch hydraulic lines in the switching valve; and a control portion that controls operations of the electric oil pump and the switching valve, wherein the control portion is configured to:
  operate the electric oil pump by first, second, and third operation amounts,
  stop the electric oil pump according to temperature of the driving motor and temperature change rate operating region of the driving motor, and
  turns on or off the solenoid valve when the temperature change rate of the driving motor is within a first predetermined operating region in relation to time and temperature of the driving motor, wherein the control portion is further configured to operate the electric oil pump:
  by i.) the second operation amount and turns on the solenoid valve when the temperature change rate of the driving motor falls within a second predetermined operating region and the temperature of the driving motor is greater than or equal to a reference temperature,
  by ii.) the third operation amount and turn on the solenoid valve when the temperature change rate of the driving motor is within a third predetermined operating region and the temperature of the driving motor is greater than or equal to the reference temperature, and
  by iii.) turn off the electric oil pump and the solenoid valve when the temperature change rate of the driving motor is within a fourth predetermined operating region, or the temperature change rate of the driving motor is within the third predetermined operating region and the temperature of the driving motor is less than the reference temperature.

2. A method for controlling a cooling system which cools a driving motor of a hybrid vehicle by pumping oil by an electric oil pump and delivering the pumped oil to the driving motor by a control of a solenoid valve, the method comprising:
  determining, by a control portion, the driving motor is operational;
  detecting, by the control portion, a temperature of the driving motor while the driving motor is operating;
  calculating, by the control portion, a temperature change rate of the driving motor based on the detected temperature of the driving motor;
  determining, by the control portion, the temperature change rate of the driving motor is greater than or equal to a first predetermined operating region; and
  operating, by the control portion, the electric oil pump by a first operation amount and turning on the solenoid valve responsive to the temperature change rate operating region of the driving motor being greater than or equal to the first predetermined operating region in relation to time and temperature of the driving motor,
  wherein when the temperature change rate of the driving motor is less than the first predetermined operating region,
    determining, by the control portion, the temperature of the driving motor is greater than or equal to a reference temperature;
    turning off the electric oil pump and the solenoid valve responsive to the temperature of the driving motor being less than the reference temperature;
    determining, by the control portion, the temperature change rate of the driving motor is within a second predetermined operating region responsive to the temperature of the driving motor being greater than or equal to the reference temperature;
    operating, by the control portion, the electric oil pump by a second operation amount and turning on the solenoid valve responsive to the temperature change rate of the driving motor being within the second predetermined operating region,
    determining, by the control portion, the temperature change rate of the driving motor is within a third predetermined operating region responsive to the temperature change rate of the driving motor not being within the second predetermined operating region; and
    operating, by the control portion, the electric oil pump by a third operation amount and turning on the solenoid valve responsive to the temperature change rate of the driving motor being within the third predetermined operating region.

3. The method of claim 2, further comprising: turning off the electric oil pump and the solenoid valve responsive to the temperature change rate of the driving motor being within a fourth predetermined operating region.

4. A tangible, non-transitory, computer-readable medium having instructions thereon to control a cooling system which cools a motor by pumping oil by an oil pump and delivering the pumped oil to the motor by a control of a solenoid valve, the instructions when executed by a processor perform acts of:
  determining the motor is operational;
  detecting a temperature of the motor while the motor is operating;
  calculating temperature change rate of the motor based on the temperature of the motor;
  determining the temperature change rate of the motor is larger than or equal to a first predetermined operating region; and
  operate the oil pump by a first operation amount and turning on the solenoid valve responsive to the temperature change rate operating region of the motor being within the first predetermined operating region in relation to time and temperature of the motor;
  determining the temperature of the motor is greater than or equal to a reference temperature responsive to the temperature change rate of the motor being less than the first predetermined operating region;
  turning off the electric oil pump and the solenoid valve responsive to the temperature of the motor being less than the reference temperature;
  determining the temperature change rate of the motor is within a second predetermined operating region responsive to the temperature of the motor being greater than or equal to the reference temperature;
  operating the electric oil pump by a second operation amount and turning on the solenoid valve responsive to the temperature change rate of the driving motor being within the second predetermined operating region;
  determining the temperature change rate of the motor is within a third predetermined operating region responsive to the temperature change rate of the motor not being within the second predetermined operating region;

operating the electric oil pump by a third operation amount and turning on the solenoid valve responsive to the temperature change rate of the motor being within the third predetermined operating region; and turning off the oil pump and the solenoid valve responsive to the temperature change rate of the motor being within a fourth predetermined operating region.

* * * * *